Nov. 7, 1950 R. J. HIGERD 2,529,157
ROUTING TOOL
Filed March 31, 1949
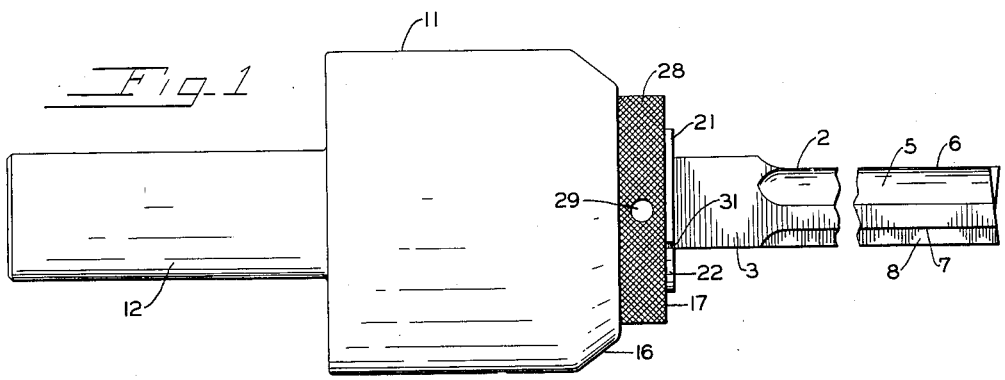
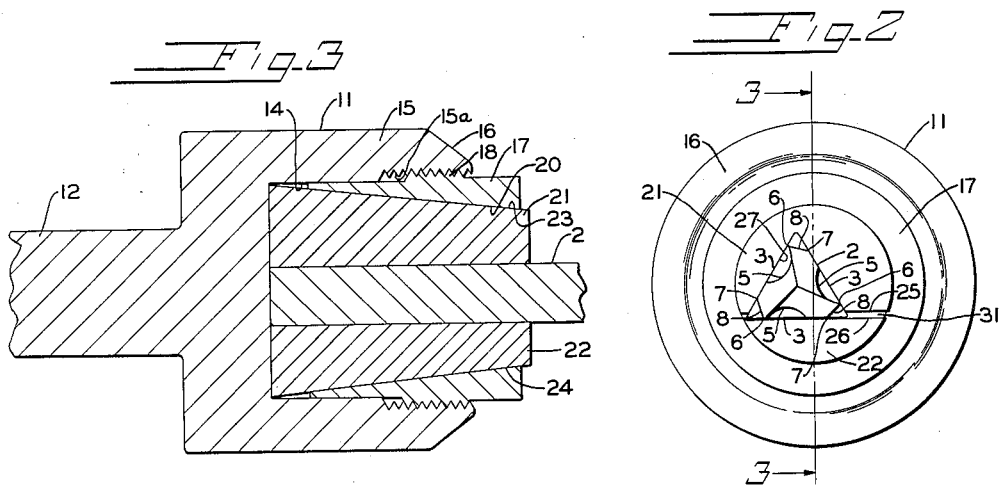
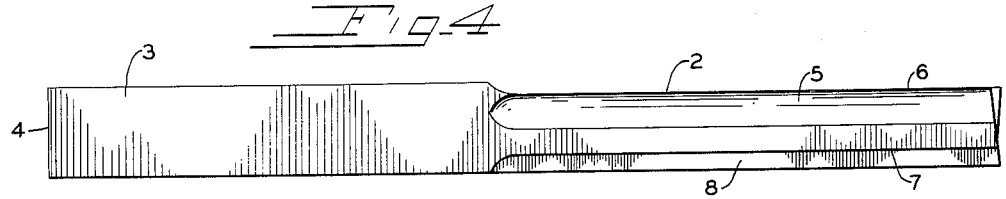
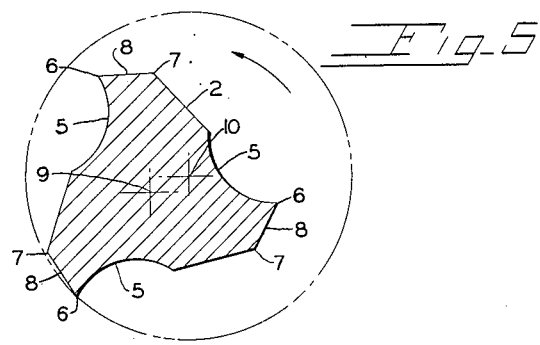
*INVENTOR.*
ROBERT J. HIGERD
BY
Clarence E. Des Jardins
HIS ATTORNEY Patented Nov. 7, 1950

2,529,157

UNITED STATES PATENT OFFICE 2,529,157

ROUTING TOOL

Robert J. Higerd, Latrobe, Pa., assignor to Kennametal Inc., Latrobe, Pa., a corporation of Pennsylvania Application March 31, 1949, Serial No. 84,717

1 Claim. (Cl. 29—103)

This invention relates to a routing tool, and it pertains more particularly to a routing tool comprising a multi-sided bar provided with a plurality of cutting edges, and a chuck or clamp for holding the bar with any one of its cutting edges selectively contacted with a work object at one time. While the bar may be made of any suitable material and used for all the purposes for which routing tools are generally used, it is preferably made of cemented hard carbide and is especially adapted for routing wood, molded plastic compositions, metal and the like.

An object of the invention is to provide a routing bar which is constructed to better withstand the stresses to which it is subjected in use.

Another object of the invention is to provide a multi-edged routing bar of a construction in which the cutting edges are more effectively brought against the surface of the work object that is to be routed.

Another object of the invention is to provide a multi-edged routing bar which can be more easily fabricated and is more durable and efficient in use.

Another object of the invention is to provide a routing tool comprising a chuck and a multi-edged bar which may be readily changed in the chuck to bring any one of the cutting edges of the bar in working position.

Further objects, and objects relating to details of construction and use, will definitely appear from the detailed description to follow.

My invention is clearly defined and pointed out in the appended claims.

A structure constituting a preferred embodiment is illustrated in the accompanying drawings, forming a part of the specification in which:

Fig. 1 is a side elevation of the routing tool embodying my invention.

Fig. 2 is a right-hand elevation of the routing tool.

Fig. 3 is a longitudinal cross section on line 3—3 of an intermediate portion of the chuck clamp of the tool.

Fig. 4 is a plan view of one of the side faces of the routing bar.

Fig. 5 is a cross-sectional view through the routing tool showing in dot-and-dash lines the cutting circle representative of the work, the location of the axis of the tool and of the axis of rotation of the tool being indicated by crosses in dot-and-dash lines.

The routing bar is elongated with its cutting end of the general cross-sectional form of an equilateral triangle having the longitudinal corners removed in planes sloping rearwardly from one face of the triangle to an adjacent face, thereby forming three parallel cutting edges with a relief surface in the rear of each cutting edge. A clearance channel or groove is formed in front of each of the cutting edges and extends parallel therewith, the channels or grooves being preferably concave in shape. The wall of the channel or groove forms one side of the cutting edge and the rearwardly sloping relief surface forms the other side thereof, and these sides diverge from the cutting edge. So constructed, there is a body portion of substantial width, circumferentially, beneath each cutting edge. The cutting edges extend parallel to each other and to the axis of the bar throughout the working length of the routing bar.

The routing bar is secured in a suitable chuck or clamp for holding it in position to be rotated against a work object. The chuck has a holding shank extending centrally from one end and a cylindrical socket formed in the opposite end, concentric with the shank. Clamping sections or segments, having tapered arcuate exterior wall surfaces, are inserted in the socket and surrounded by a cylindrical sleeve, having a tapered bore conforming to the exterior surfaces of the clamped sections, which is adjustably connected with the chuck for radially adjusting the clamping sections. One of the clamping sections is provided with a socket or recess, eccentric to the socket in the chuck, for receiving the end of the routing bar whose cutting end is provided with the plurality of cutting edges as set forth above. With the routing bar mounted in the eccentrically disposed recess or socket in one of the clamping sections, any one of its cutting edges is selectively brought into contact with the work to be routed, the other cutting edges being held out of contact with the work while the selected one is in use.

The routing bar is used until all of its cutting edges have become dulled, after which it may be redressed. Use of only one cutting edge of the routing bar at a time prolongs its life and renders same more efficient than when all of the cutting edges are simultaneously employed. Moreover, with the routing bar positioned in the chuck for use of only one cutting edge at a time, the need for redressing the edges is less frequent.

The shape of the routing bar lends itself to being continuously extruded into a triangular shaped bar from a cemented hard carbide composition and cut into suitable lengths to be machined into routing bars.

Referring specifically to the drawings in which like numerals are used to designate like parts, numeral 2 denotes generally a routing bar which in cross section is generally in the shape of an equilateral triangle having three sides 3. Along a substantial length of the end of the bar opposite to the non-cutting end 4, each of the corners between the adjacent sides is truncated, on a circumferential bias, to provide two edges 6 and 7 at opposite ends of an intervening flat relief surface 8. The routing tool is rotated counterclockwise, in the direction of the arrow in Fig. 5, and the forward edge 6 is, because of the bias truncated relief surface, disposed farther away from the axis of the routing tool than is the rearward edge 7. Therefore, the truncated relief surface between the forward and rearward edges is out of contact with the wall of the work object being routed. Each of the sides of the routing bar has a groove or channel 5 formed therein next adjacent to the forward or cutting edge 6 of the truncated relief surface, this being a clearance groove or channel for the refuse material from the work object resulting from the routing. The grooves or channels form the forward or cutting edges at sharper angles as well as being clearance spaces for the refuse material. The grooves or channels are preferably concave in form and coextend, in parallel relation, with the forward or cutting edges. The routing bar is held in working position with its longitudinal axis 9 eccentrically disposed to the longitudinal axis 10 of the holder, which is the axis about which the routing tool is rotated, thereby bringing, as shown in Fig. 5, only one of the cutting edges into contact with the work object at one time. Each of the three cutting edges may be selectively brought into operative position by adjusting the routing tool within the holder.

The routing bar or tool above described is preferably made of any of the sintered hard carbide compositions used for cutting compositions on the market. The particular nature of the sintered hard carbide cutting composition used will depend upon the work for which the routing tool is intended. For some classes of work the routing tool may be made of a hard composition consisting of tungsten carbide sintered with cobalt or nickel.

The routing bar or tool can be used with any chuck or clamp which is of a construction to permit it being held in an eccentric position so as to be rotated with one of its cutting edges against the work object. Although the chuck or holder need not be of any specific construction, a particular one is shown for illustrating the manner in which the routing bar or tool is used. The holding tool shown comprises a chuck 11, preferably cylindrical, which is reduced at one end to provide a holding shank 12 for attaching said chuck to a machine or tool for rotating the routing bar, the shank being concentric with the axis of the chuck. The opposite end of the chuck is recessed centrally, concentric with the shank, to provide a socket 14 in which a cylindrical sleeve 17 is adjustably fitted by means of screw threads 15a thereon engaging the screw threads 18 on the socket wall 15. This sleeve 17 surrounds clamping sections 21 and 22, with its interior wall 20 tapered to conform with the taper of the exterior wall surfaces 23 and 24 of the clamping sections. Side 25 of section 21 is provided with recess 27 eccentrically disposed to the shank end of the chuck for insertion of the non-cutting end of the routing bar or tool to be clamped against side 26 of section 22, this recess being of less cross section than the cross section of the non-cutting end of the cutting bar, leaving the adjacent sides 25 and 26 of the sections spaced apart at 31. The end of the chuck is chamfered at 16, and the end of the sleeve 17 is knurled at 28, as well as being provided with recesses 29 for the reception of a spanner wrench.

From the foregoing description of the routing tool, its manner of use will be obvious. The routing bar is attached to the machine or tool by means of the holding shank, and the bar is clamped within the chuck, eccentrically disposed as shown in Fig. 2, for bringing one of the three cutting side edges which is on the longer radius, in working position with the work object (Fig. 5). Only one of the cutting edges is used at a time, the other cutting edges, except the one in use, being out of contact with the work object. The cutting edges are selectively used until all have become dull and the routing bar needs redressing. The routing bar is of a novel construction for more efficient and effective operation with only one cutting edge in use at a time. Although this routing bar or tool is provided with a plurality of cutting edges, the tool is stronger and more durable than tools, heretofore known, having a plurality of cutting edges because of the fact that the cutting edge is supported by a body of material of strong cross section so that the portion of the routing bar forming the lever arm between the axis of rotation and the effective cutting edge is strong enough to take the stresses imposed thereon in use.

I am aware that the device shown and described herein is susceptible of considerable variation without departing from the spirit of my invention and, therefore, I claim my invention broadly as indicated by the appended claim.

Having thus described my invention, what I claim as new and useful, and desire to secure by Letters Patent, is:

A routing tool unit comprising the combination of an elongated bar having a plurality of cutting edges symmetrically arranged about the axis of the bar, a tool holder having means at one end for attaching it to a rotating power source and a chuck at the other end for securing the bar, and cooperating means on said chuck and bar for holding said bar fixed with respect to said holder with the axis of the bar parallel to and disposed laterally from the axis of rotation of the holder and with one cutting edge in cutting position, whereby when said cutting edge becomes dull the bar may be positioned with another cutting edge in cutting position.

ROBERT J. HIGERD.

REFERENCES CITED

The following references are of record in the file of this patent:

UNITED STATES PATENTS

| Number | Name | Date |
|---|---|---|
| 200,285 | Hall | Feb. 12, 1878 |
| 327,148 | Faught | Sept. 29, 1885 |
| 1,125,649 | Carr | Jan. 19, 1915 |
| 1,603,739 | Borgeson | Oct. 19, 1926 |
| 1,887,372 | Emmons | Nov. 8, 1932 |
| 2,113,178 | Gase | Apr. 5, 1938 |
| 2,260,288 | Black | Oct. 28, 1941 |
| 2,349,959 | Guetzkow | May 30, 1944 |

FOREIGN PATENTS

| Number | Country | Date |
|---|---|---|
| 36,592 | Norway | Oct. 15, 1920 |
| 369,523 | Italy | Mar. 22, 1939 |